(12) United States Patent
Smith et al.

(10) Patent No.: US 7,830,560 B2
(45) Date of Patent: Nov. 9, 2010

(54) SYSTEM AND METHOD FOR ADAPTIVE DIGITAL RAMP CURRENT CONTROL

(75) Inventors: Kenneth K. Smith, Boise, ID (US);
Craig T. Johnson, San Diego, CA (US);
Stuart Allman, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 11/700,458

(22) Filed: Jan. 31, 2007

(65) Prior Publication Data
US 2008/0180042 A1    Jul. 31, 2008

(51) Int. Cl.
H04N 1/04 (2006.01)
B41J 2/415 (2006.01)
B41J 2/385 (2006.01)
H01J 41/00 (2006.01)
G01J 1/34 (2006.01)

(52) U.S. Cl. .............. 358/475; 347/128; 250/214 AL; 250/214 AG; 250/227.21

(58) Field of Classification Search ............. 358/509, 358/510, 513, 520, 475, 480, 482; 347/128, 347/129, 130, 135, 224, 255; 250/201.9, 250/205, 552, 559.06, 214 LA, 214 AG, 227.21
See application file for complete search history.

(56) References Cited

U.S. PATENT DOCUMENTS

| | | | |
|---|---|---|---|
| 4,459,475 A * | 7/1984 | Flint et al. ............ 250/214 AG |
| 5,581,071 A * | 12/1996 | Chen et al. ............ 235/462.06 |
| 6,057,870 A * | 5/2000 | Monnier et al. ............ 347/171 |
| 6,791,276 B2 | 9/2004 | Li |
| 6,836,157 B2 | 12/2004 | Rader et al. |
| 7,038,402 B1 | 5/2006 | Adler et al. |
| 2001/0012612 A1 | 8/2001 | Petersen et al. |
| 2003/0011625 A1 | 1/2003 | Kellis |
| 2004/0135522 A1 | 7/2004 | Berman et al. |
| 2004/0147824 A1 * | 7/2004 | Diab et al. ............ 600/323 |
| 2005/0162101 A1 | 7/2005 | Leong et al. |
| 2005/0225976 A1 | 10/2005 | Zampini et al. |
| 2005/0231263 A1 | 10/2005 | Kawai |
| 2006/0091826 A1 | 5/2006 | Chen |
| 2010/0019127 A1 * | 1/2010 | Kagawa et al. ............ 250/208.1 |

* cited by examiner

*Primary Examiner*—Jerome Grant, II (57) ABSTRACT

An adaptive digital ramp current control system comprises a digital current ramp controller configured to digitally ramp a current level supplied to at least one light emitting diode (LED) according to a predetermined ramp profile, the ramp profile comprising at least one intermediate current level step between a minimum current level and a maximum current level.

16 Claims, 5 Drawing Sheets

SYSTEM AND METHOD FOR ADAPTIVE DIGITAL RAMP CURRENT CONTROL

BACKGROUND OF THE INVENTION

Light emitting diodes (LEDs) are often driven with a square wave signal that turns the LED on when the signal goes to a high voltage and off when the signal goes to a low voltage. One application for LEDs is to provide illumination in a scanning device as part of a contact image sensor (CIS). A contact image sensor typically includes an array of optical sensors and red, green, and blue illumination LEDs. The contact image sensor is held in close proximity to the media being scanned, in contrast to other scanning systems that utilize mirrors and other optical components to channel light to the sensors. Contact image sensors allow for higher power efficiency than is typically achievable with other scanner technologies.

The intensity of the light from the LED is dependent on the duty cycle and current level of the square wave signal with higher duty cycles and current levels providing more light. Unfortunately, using a square wave signal to drive an LED may produce undesirable effects such as radiated emissions and ground bounce. Undesirable radiated emissions include radio frequency interference (RFI) where steep rises and drop-offs in the square wave currents cause the RFI spectrum to widen and spread to undesirable frequencies. Ground bounce is the presence of a voltage potential on a circuit board ground conductor that is intended to have a voltage potential of zero. Ground bounce is often caused by a combination of conductor impedance, which includes reactance, with a rapid influx or abrupt termination of current and may affect the operation of other circuit components connected to the ground conductor.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
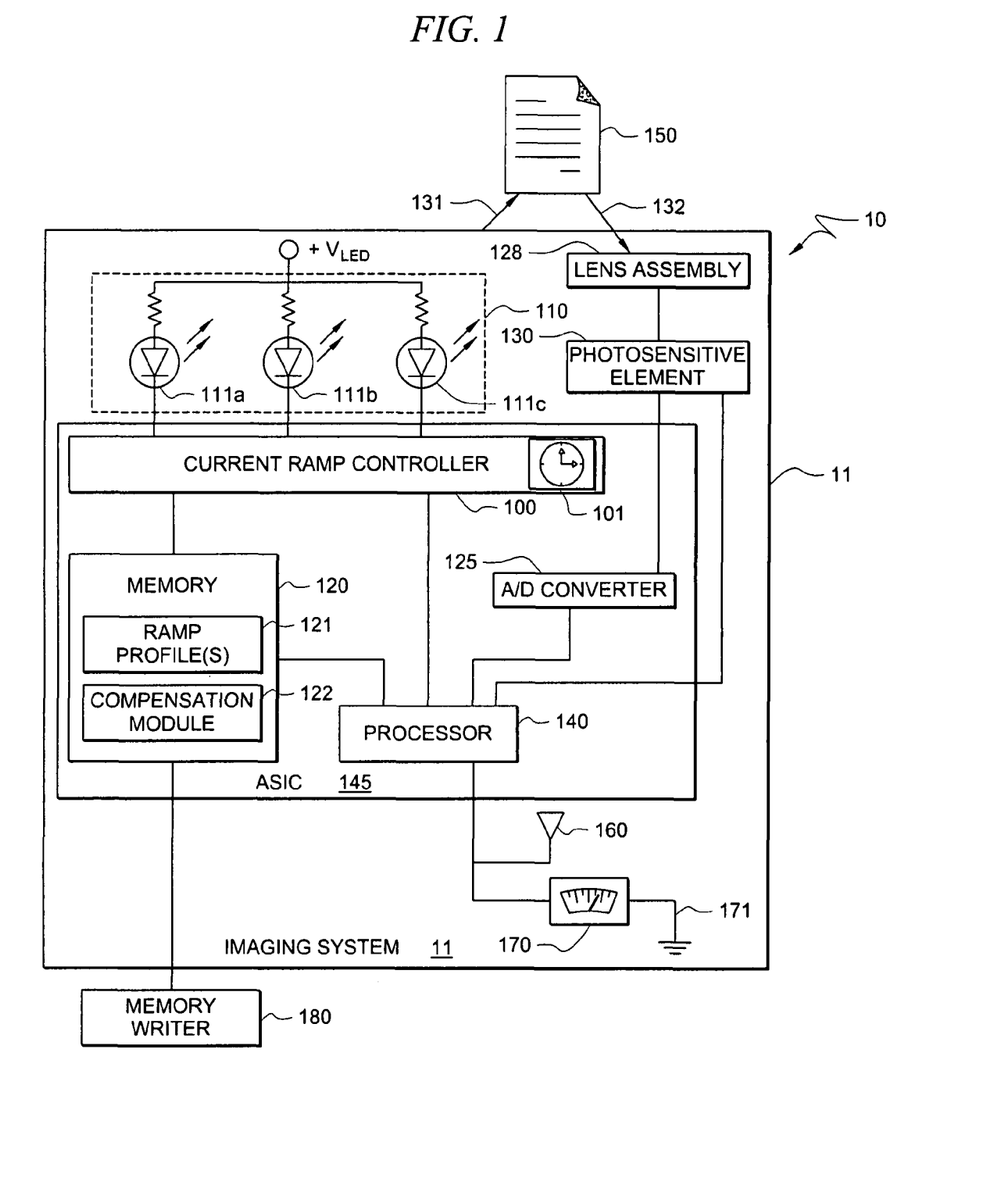
FIG. 1 is a diagram illustrating an embodiment of an adaptive digital ramp current control system.

FIG. 1 is a diagram illustrating an embodiment of an adaptive digital ramp current control system 10. In the embodiment illustrated in FIG. 1, system 10 is implemented in an imaging system 11. Imaging system 11 may comprise any type of device for generating an image of an object such as, but not limited to, a scanner, a copier, a facsimile machine and a multi-function device. However, it should be understood that system 10 may be implemented in other types of devices.

In the embodiment illustrated in FIG. 1, system 10 comprises a current ramp controller 100, a light bar 110, a memory 120, an analog-to-digital (A/D) converter 125, a lens assembly 128, a photosensitive element 130, and a processor 140. Current ramp controller 100 is used to control current supplied to light bar 110 and comprises a clock 101 for providing a timing signal used to control the timing of amplitude changes in the current supplied by current ramp controller 100 to light bar 110. Current ramp controller 100 may comprise hardware, software, firmware, or a combination thereof.

In the embodiment illustrated in FIG. 1, light bar 110 comprises one or more light sources such as light emitting diodes (LEDs) 111a-c and is powered by a connection to a voltage source $V_{LED}$. However, it should be understood that light bar 110 may comprise other types of light emitting devices. In FIG. 1, light bar 110 is illustrated having three LEDs 111a-c; however, it should be understood that light bar 110 may comprises a greater or lesser quantity of LEDs. Memory 120 may comprise volatile memory, non-volatile memory, flash memory and/or a permanent storage device, such as a digital media drive device. In the embodiment illustrated in FIG. 1, memory 120 comprises ramp profile(s) 121 having information associated with a predetermined current profile used by current ramp controller 100 to control a current supply provided to light bar 110. For example, in some embodiments, ramp profile(s) 121 comprises information in the form of digital symbols that enables current ramp controller 100 to supply current to light bar 110 according to a predetermined sequence of steps (each step comprising a predetermined current amplitude level) and a corresponding step duration (indicating a time period for maintaining a particular current amplitude) that is controlled by clock 101. Current ramp controller 100 uses ramp profile(s) 121 and clock 101 to automatically set current amplitude levels and current amplitude durations supplied to light bar 110 for illuminating LEDs 111a-c. Ramp profile(s) 120 may comprise a single ramp profile 120 usable for any imaging process performed by imaging system 11 or may comprise a plurality of ramp profiles 120 each usable for different types of imaging processes and/or dynamically selectable by current ramp controller 100 based on the characteristics of imaging system 11).

Processor 140 is coupled to memory 120, current ramp controller 100, photosensitive element 130, A/D converter 125. Processor 140 is configured to cause current ramp controller 100 to control light bar 110 so that LEDs 111a-c are actuated to illuminate at least a portion of an object to be imaged or scanned, such as a document 150. In operation, LEDs 111a-c are actuated and light (indicated by 131 in FIG. 1) is directed toward document 150. Light reflected and/or transmitted through document 150 (indicated by 132 in FIG. 1) is received by lens assembly 128 and focused/reduced onto photosensitive element 130. Lens assembly 128 may comprise a lens assemblage, a mirror assemblage and/or another device for focusing light onto photosensitive element 130. Photosensitive element 130 may comprise any type and/or array of photosensitive device(s) such as, but not limited to, a charge coupled device (CCD) or a complementary metal-oxide semiconductor (CMOS) imaging sensor. Photosensitive element 130 is positioned and configured to detect light reflected by and/or transmitted through document 150 and convert the detected light into an electrical signal for generating a scanned image of document 150. The analog signal from photosensitive element 130 is received by A/D converter 125 and converted into digital format for further processing, such as the generation of a scanned image of document 150. In some embodiments, light detector 130 and light bar 110 may be formed as a single unit. It should be understood that a scanned image of an object may be acquired using a reflective scanning process or a transmissive scanning process. It should also be understood that imaging system 11 may be configured as a contact image sensor (CIS)-type of scanning device, a scanning device utilizing reduction optics, or other type of scanning device. In the embodiment illustrated in FIG. 1, current ramp controller 100, memory 120, A/D converter 125 and processor 140 are implemented and/or otherwise embodied on an application specific integrated circuit (ASIC) 145. For example, in some embodiments, current ramp controller 100 and associated control circuitry may be partially or completely integrated into ASIC 145. However, it should be understood that imaging system 11 may be otherwise configured.

In operation, current ramp controller 100 receives an instruction from processor 140 to turn on at least one of LEDs 111a-c in light bar 110. Current ramp controller 100 digitally ramps up, or generally increases, the current level supplied to light bar 110 by incrementing the current from a low level, possibly zero, to one or more intermediate steps or current amplitude levels until a desired maximum current amplitude level is reached. At the one or more intermediate steps, current ramp controller 100 temporarily holds the current amplitude at the predetermined current level for a predetermined length of time according to information stored in ramp profile(s) 121. It should be understood, however, that in some embodiments, ramping the current up to a maximum level may comprise some using intermediate steps in which the current amplitude is equal to, or even below, the current amplitude of a preceding step. Current ramp controller 100 further digitally ramps down, or generally decreases, the current level supplied to light bar 110 by decrementing the current by two or more steps until a lowest level, possibly zero, is reached while temporarily holding the current level at one or more intermediate steps for a predetermined length of time according to information stored in ramp profile(s) 121. It should be understood that the ramp up and ramp down current level steps need not be reversed versions of each other (e.g., the ramp up and ramp down current level profiles may or may not use the same current level increase/decrease amounts and/or corresponding holding times). Further, it should be understood that current ramp controller 100 may incrementally ramp up the current and abruptly turn it off without any intervening incremental decreases, or may abruptly turn current on to a maximum desired level and incrementally ramp the current level down.

In some embodiments, ramp profile(s) 121 comprises two or more digital symbols each of which comprises two or more bits. In some embodiments, the current ramping is adaptive because ramp profile(s) 121 may be modified and/or adjusted in memory 120 by processor 140 and/or another memory writing device temporarily coupled to memory 120. For example, in some embodiments, ramp profile(s) 121 is written to memory 120 during manufacture, repair and/or maintenance of system 10 by a memory writer 180 temporarily coupled to imaging system 11. In some embodiments, ramp profile(s) 121 may be dynamically modified and/or adjusted. For example, in the embodiment illustrated in FIG. 1, system 10 further comprises a radio frequency (RF) sensor 160 and a ground bounce meter 170. RF sensor 160 detects RF emissions from LEDs 111a-c, and ground bounce meter 170 detects voltages on a ground conductor 171 of imaging system 11. In the embodiment illustrated in FIG. 1, system 10 also comprises a compensation module 122. Compensation module 122 analyzes measurements of RF sensor 160 and/or ground bounce meter 170 to create and/or modify ramp profile(s) 120. Compensation module 122 may comprise hardware, software, firmware, or a combination thereof. In FIG. 1, compensation module 122 is illustrated as being stored in memory 120 so as to be accessible and executable by processor 140. However, it should be understood that compensation module 122 may be otherwise stored and/or located. It should be understood that in some embodiments, RF sensor 160, ground bounce meter 170, and/or compensation module 122 may be only temporarily coupled to imaging system 11 for the purposes of establishing ramp profile(s) 121 for imaging system 11 (e.g., during manufacture, repair and/or maintenance of imaging system 11).

In operation, processor 140 uses data from RF sensor 160 and/or ground bounce meter 170, along with logic, data and instructions from compensation module 122, to calculate ramp profile(s) 121 and/or modify or adjust ramp profile(s) 121 in order to reduce RF emissions and/or ground bounce. RF emissions and ground bounce are generally undesirable signals that occur as a result of switching current supplied to LEDs 111a-c on and off. RF emissions and ground bounce are caused by the interaction of electricity with LEDs 111a-c and ground conductor 171. The manner in which the current is switched on and off affects the characteristics of the RF emissions and ground bounce, for example, by affecting the amplitudes and frequency content Thus embodiments of system 10 tailor the manner in which the current is switched on and off to LEDs 111a-c to substantially reduce and/or eliminate undesirable effects of RF emissions and/or ground bounce, such as high amplitudes or specific frequency content. For example, processor 140 may adjust the rate of the ramping, such as by changing the quantity, increment sizes and/or durations of intermediate current level steps so that the current supplied to light bar 110 switches on and/or off either faster and/or slower. In some embodiments, ramp profile(s) 121 may be determined and stored in memory 120 during the manufacturing of imaging system 11 as a result of determining, estimating and/or testing the RF emissions and/or ground bounce characteristics of light bar 110. In some embodiments, new or modified ramp profile(s) 121 may be determined and stored in memory 120 during maintenance or repair of imaging system 11 and/or during operation of imaging system 11 (e.g., measurements may be taken by from RF sensor 160 and/or ground bounce meter 170 and analyzed compensation module 122 during each scan, periodically after a predetermined number of scans, etc., to generate and/or modify ramp profile(s) 120). Thus, in some embodiments, based on present RF emissions and/or ground bounce characteristics of light bar 110, compensation module 122 may modify a particular ramp profile 120 and/or instruct current ramp controller 100 to use a particular one of several stored ramp profiles 120.

Figure 2:
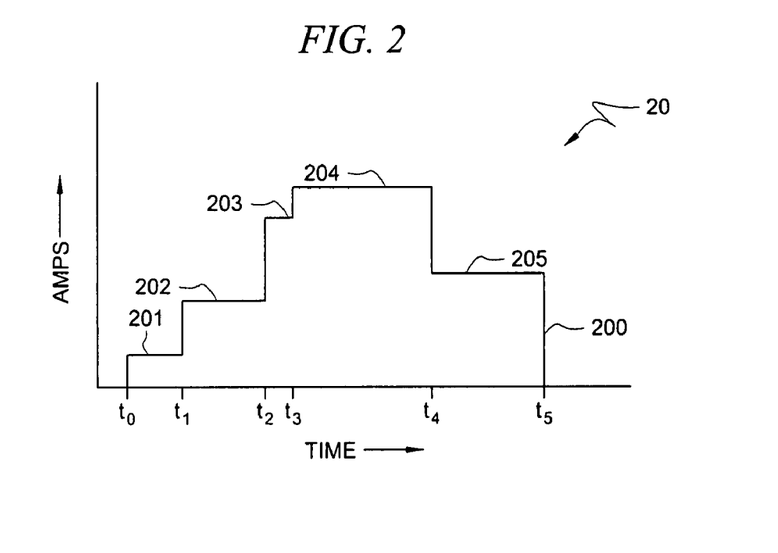
FIG. 2 is a diagram illustrating a magnitude plot of an embodiment of a digitally-ramped current profile using the adaptive digital ramp current control system of FIG. 1.

FIG. 2 illustrates a magnitude plot 20 of an embodiment of ramp profile 121 usable by current ramp controller 100. In FIG. 2, plot 20 comprises current plot curve 200 having intermediate non-zero current level steps 201-203 and 205, along with a maximum desired current level 204. Current plot curve 200 rises above a zero level at to reach a current level 201. Current ramp controller 100 holds the current at level 201 until $t_1$, at which time current ramp controller 100 increases the current supplied to one or more of LEDs 111a-c to current level 202. Current ramp controller 100 holds the current at level 202 until $t_2$ when current ramp controller 100 increases the current supplied to one or more of LEDs 111a-c to current level 203, where it is held until $t_3$. At time $t_3$, the current reaches a highest desired level 204, which is maintained until $t_4$. At time $t_4$, current ramp controller 100 decreases the current to current level 205, which is lower than highest level 204, but still greater than zero. Current level 205 is held until $t_5$. At $t_5$, current ramp controller 100 turns off current to light bar 110. Ramp profile 121 contains data indicating the step current levels (e.g., increments/decrements and/or durations) so that the current level supplied to light bar 110 follows a predetermined profile such as that reflected by current plot curve 200. Although plot 20 is shown comprising a series of current level steps of arbitrary magnitude and duration, it should be understood that the current level steps and durations may be selected from a finite number of steps that are used for ramping up and/or down, and that the durations may be increments of the clock period of clock 101. For example, if the current level steps are indicated with a 4-bit digital symbol in ramp profile 121, current plot curve 200 could have up to fifteen different current levels, including the maximum desired level. Ramp profile 121 may specify a current level value and/or a number of corresponding clock periods. Alternatively, ramp profile 121 may specify a current level value, and repeat the current level value for a desired number of clock periods (e.g., profile={1, 1, 2, 2, 2, 3, 6 . . . }).

Figure 3:
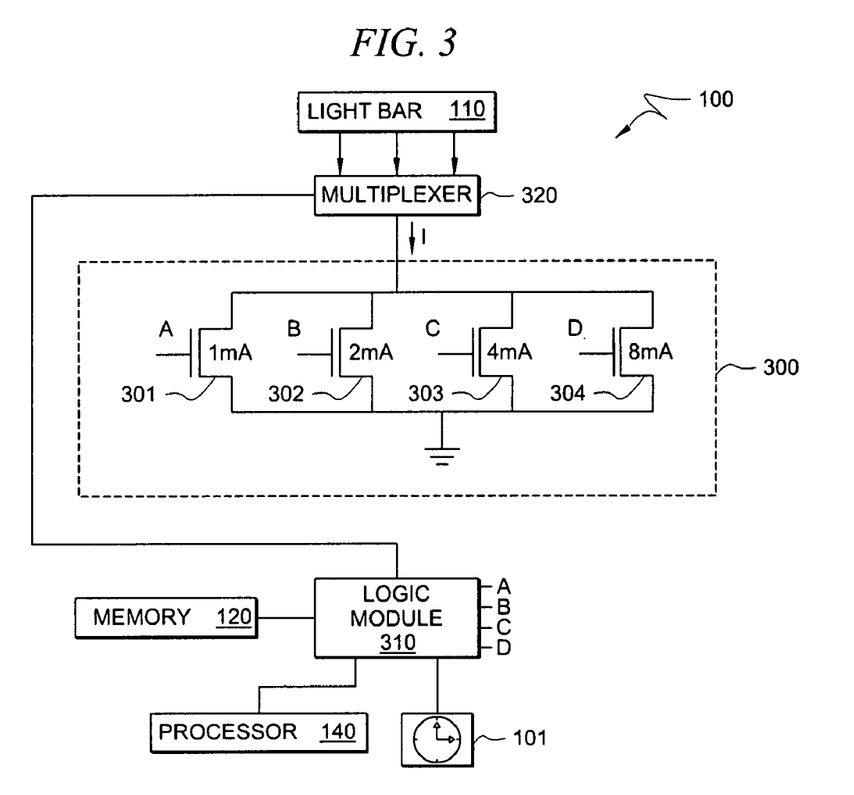
FIG. 3 is a diagram illustrating an embodiment of a current ramp controller of the adaptive digital ramp current control system of FIG. 1.

FIG. 3 is a diagram illustrating an embodiment of current ramp controller 100. In the embodiment illustrated in FIG. 3, current ramp controller 100 comprises a switch bank 300, a logic module 310, a multiplexer 320 and clock 101. Logic module 310 is coupled to switch bank 300, clock 101, multiplexer 320, memory 120 and processor 140. Logic module 310 operates at a rate set by clock 101 to convert digital symbols received from memory (e.g., corresponding to profile(s) 120) into control signals A-D. Logic module 310 also controls the operation of multiplexer 320.

In the embodiment illustrated in FIG. 3, switch bank 300 comprises four switches 301-304, which are switched on or off by signals A-D, respectively. In FIG. 3, switches 301-304 switch on current levels of 1 mA, 3 mA, 7 mA and 15 mA, respectively. By turning on various combinations of switches 310-304, any current level multiple of 1 mA may be selected between 1 mA and 15 mA, inclusive. For example, a current level of 13 mA may be achieved by turning on switches 301, 303 and 304. Switch bank 300 is coupled to light bar 110 through multiplexer 320. Multiplexer 320 routes the current (indicated by "1" in FIG. 3) to a selected one of LEDs 111a-c in light bar 110 according to the control by logic module 310. Although switch bank 300 is illustrated in FIG. 3 with four switches, a greater or lesser number may be used. For example, a bank of six switches enables sixty-three different non-zero current levels. Further, although the embodiment illustrated in FIG. 3 uses current levels of 1 mA, 3 mA, 7 mA and 15 mA, different current levels may be used.

Figure 4:
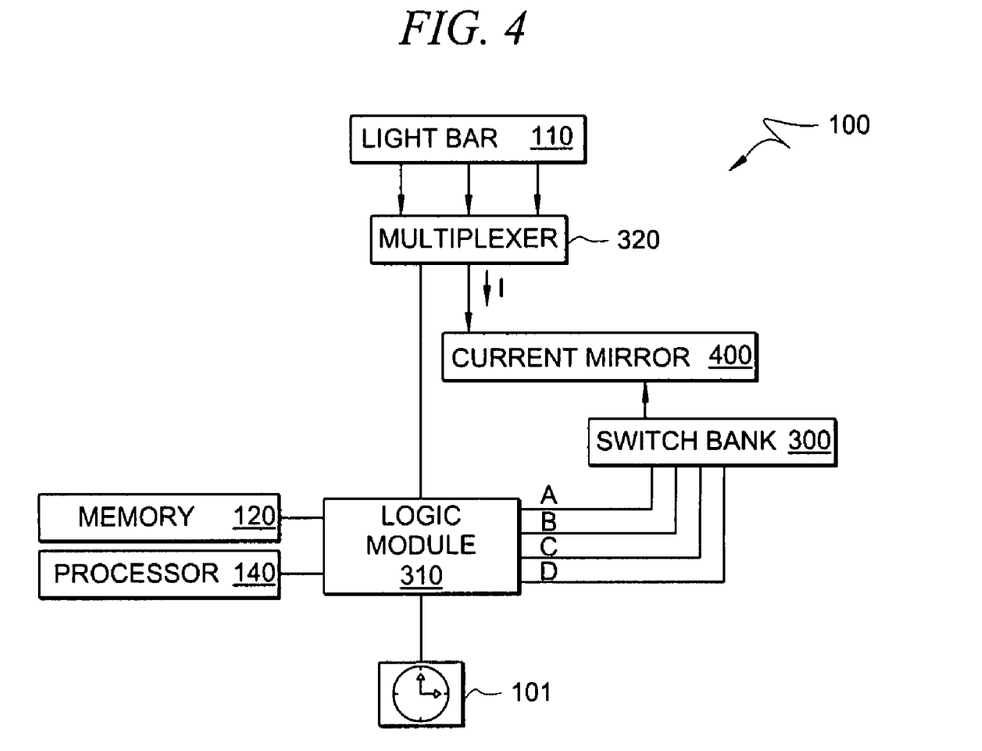
FIG. 4 is a diagram illustrating another embodiment of a current ramp controller of the adaptive digital ramp current control system of FIG. 1.

FIG. 4 is a diagram illustrating another embodiment of current ramp controller 100. In the embodiment illustrated in FIG. 4, current ramp controller 100 comprises switch bank 300, logic module 310, multiplexer 320, clock 101 and a current mirror 400. Logic module 310 is coupled to switch bank 300, clock 101, multiplexer 320, memory 120 and processor 140. Logic module 310 operates at a rate set by clock 101 to convert digital symbols received from memory (e.g., corresponding to ramp profile(s) 120) into control signals A-D and to control the operation of multiplexer 320.

Switch bank 300 provides a reference for current mirror 400. The use of current mirror 400 as a buffer between switch bank 300 and light bar 110 enables more precise regulation of the current through each of switches 301-304 by reducing the variation of the voltage drop across switch bank 300 as a result of variations in the current draw of light bar 110. Current mirror 400 is coupled to light bar 110 through multiplexer 320. Multiplexer 320 routes the current (indicated by "1" in FIG. 4) to a selected one of LEDs 111a-c in light bar 110 according to the control by logic module 310.

Figure 5:
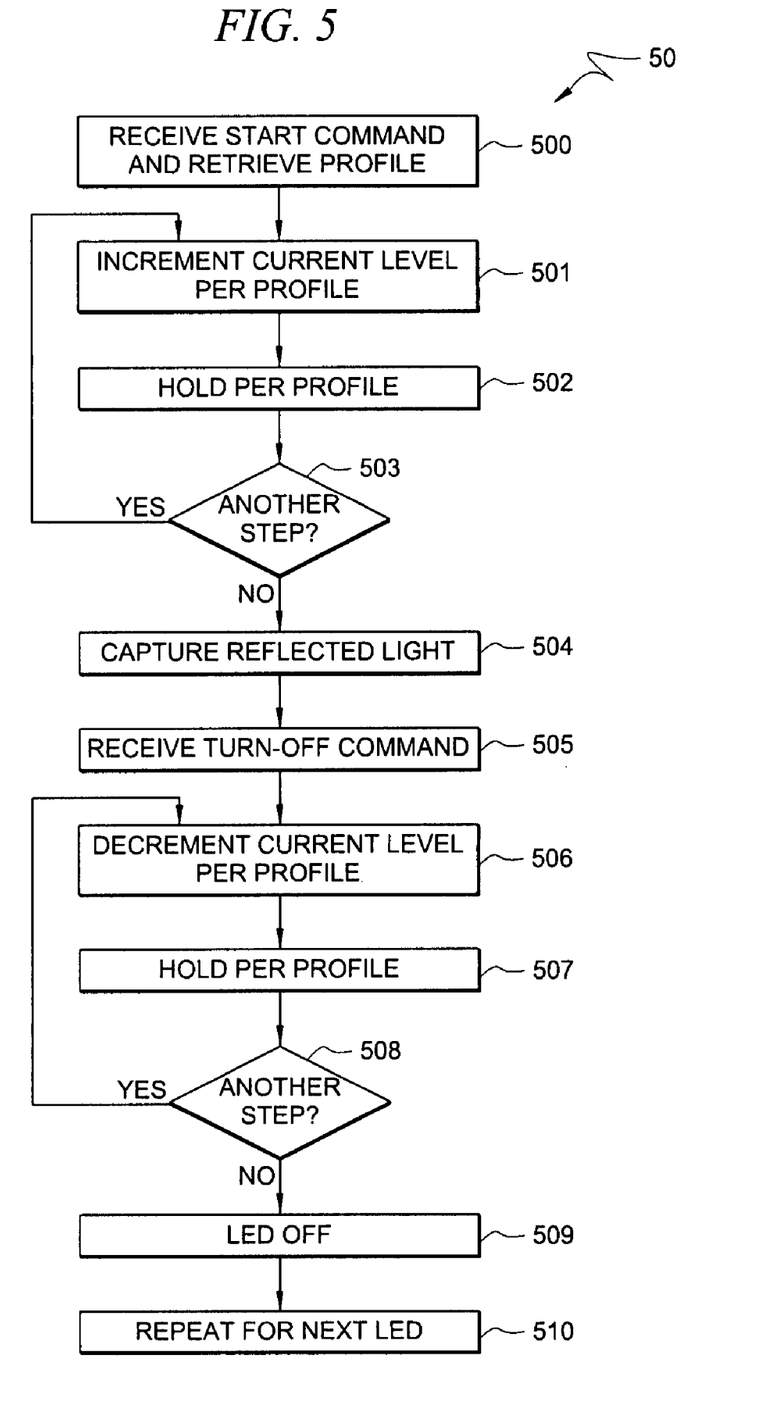
FIG. 5 is a flow diagram illustrating an embodiment of an adaptive digital ramp current control method.

FIG. 5 is a flow diagram illustrating an embodiment of an adaptive digital ramp current control method 50. Method 50 is described with reference to imaging system 11 of FIG. 1, although it should be understood that method 50 may be used with alternative embodiments.

At block 500, current ramp controller 100 receives a signal from processor 140 to turn on LED 111a in light bar 110 and retrieves predetermined ramp profile 121 from memory 120. In this embodiment, a single LED (i.e., LED 111a) is actuated. However, it should be understood that multiple LEDS may be illuminated. For example, in the embodiment described in FIG. 5, imaging system 11 scans document 150 by illuminating LEDs 111a-c one at a time, however, alternative embodiments may illuminate multiple ones of LEDs 111a-c. At block 501, current ramp controller increments the current level supplied to light bar 110 according to ramp profile 121 and, at block 502, holds/maintains the current at the particular supplied level for a time period specified by ramp profile 121. At decision block 503, logic module 310 determines if there is another ramp up current level change based on profile 121. If there are more intermediate steps as determined by logic module 310 at decision block 503, method 50 automatically returns to block 501 and increments the current level as specified by ramp profile 121. If, however, there are no further intermediate steps (e.g., indicating that the current level is presently at a desired maximum level), method 50 proceeds to block 504 where light detector 130 captures light that is reflected from document 150 illuminated by LED 111a.

After capture of reflected light at block 504, current ramp controller 100 receives a signal from processor 140 to turn off LED 111a at block 505 and decrements the current level supplied to light bar 110 according to ramp profile 121 at block 506. In the embodiment illustrated in FIG. 5, at least one intermediate decrement current level step is used to turn off LED 111a (e.g., at least one intermediate step between the desired maximum and a minimum or presumably zero current level). At block 507, current ramp controller 100 holds/maintains the current at the particular level supplied to light bar 110 for a time period specified by ramp profile 121. If, at decision block 508, logic module 310 determines that there is another decrement step in the current level, method 50 returns to block 506 and decrements the current level supplied to light bar 110 according to ramp profile 121. If there are no further current level decrement steps, method 50 proceeds from decision block 508 to block 509, where the current level presumably reaches zero and LED 111a is off. At block 510, the method repeats blocks 500-509 for the next LED, such as LED 111b.

Figure 6:
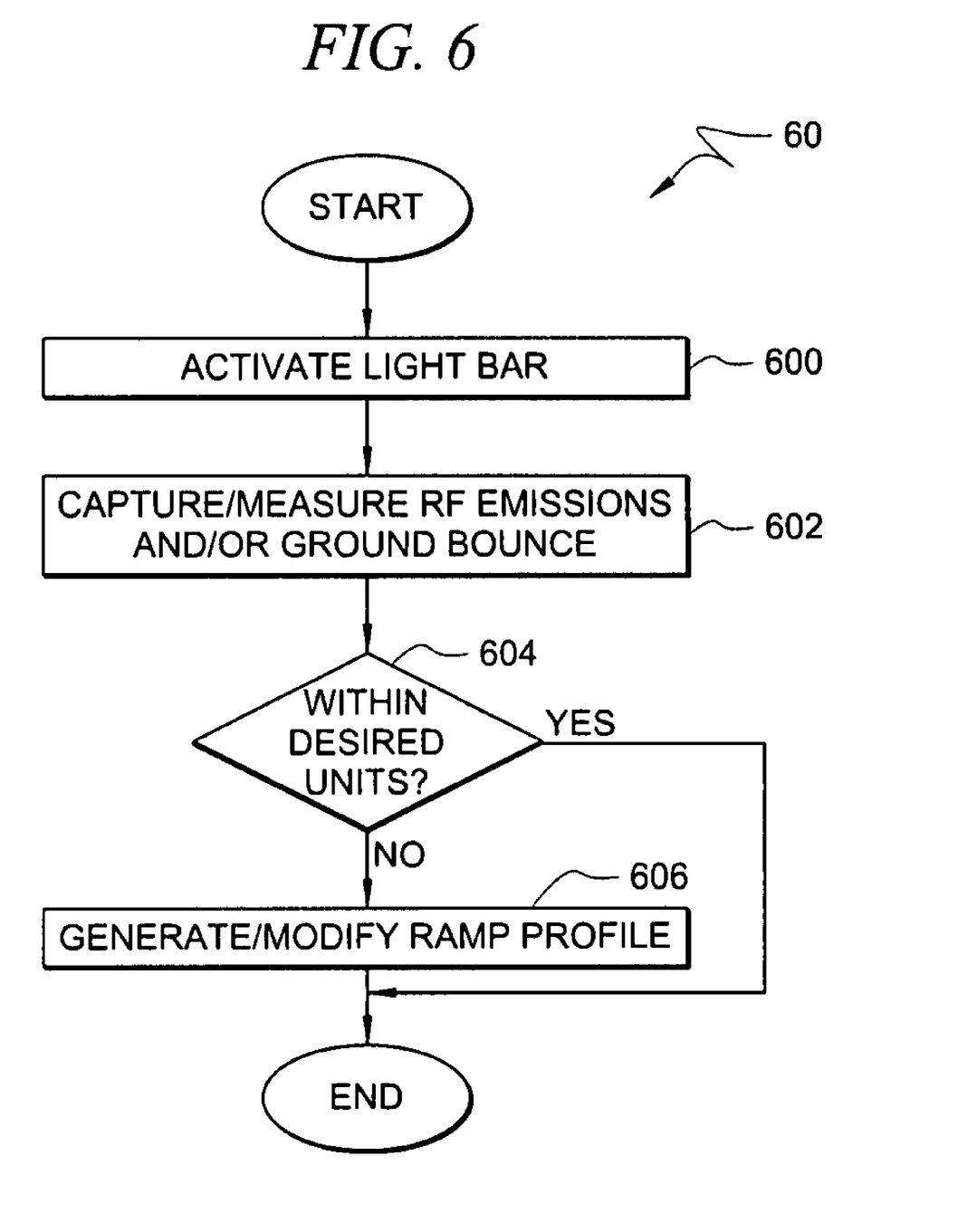
FIG. 6 is a flow diagram illustrating another embodiment of an adaptive digital ramp current control method.

FIG. 6 is a flow diagram illustrating another embodiment of an adaptive digital ramp current control method 60. The method 60 begins at block 600, where light bar 110 is actuated. The actuation of light bar 110 may be based on a stored ramp profile 120 or may be an initial activation of light bar 110 (e.g., before a particular ramp profile 120 has been generated and/or stored). At block 602, RF emissions and/or ground bounce characteristics of light bar 110 are captured and/or otherwise measured (e.g., using RF sensor 160 and/or ground bounce meter 170). At decision block 604, compensation module 122 analyses the RF emissions and/or ground bounce measurements and determines whether the RF emissions and/or ground bounce measurements are within a desired limit or level. If the RF emissions and/or ground bounce measurements are within a desired limit or level, the method ends. If at decision block 604 it is determined that the RF emissions and/or ground bounce measurements are outside and/or above a desired limit or level, the method proceeds to block 606 where compensation module 122 generates and/or modifies a particular ramp profile 120. It should be understood that after generation and/or modification of a particular ramp profile 120, the method depicted by blocks 600, 602, 604 and 606 may be repeated as necessary to facilitate further adjustments to ramp profile 120.

Thus, in one embodiment, imaging system 10 comprises a scanner device configured with a contact image sensor (e.g., photosensitive element 130) for generating a scanned image of an object. LEDs 111a-c are activated/deactivated according to a predetermined current level ramp profile 121 which is controlled by logic and/or circuitry partially or wholly integrated into an ASIC of the scanner device (e.g., ASIC 145). The current level supplied to LEDs 111a-c is incremented from a low level, possibly zero, to one or more intermediate steps or current amplitude levels until a desired maximum current amplitude level is reached to reduce RF emissions and/or ground bounce effected associated with the scanner device. The current level may also be decremented by two or more steps until a lowest level, possibly zero, is reached to reduce RF emissions and/or ground bounce effected associated with the scanner device.

Thus, embodiments of system 10 digitally increment/decrement current provided to a light source according to a predetermined and/or dynamically modified ramp profile 120 to substantially reduce and/or eliminate undesirable RF emissions and/or ground bounce effects. It should be understood that in the described methods, certain functions may be omitted, accomplished in a sequence different from that depicted in FIGS. 5 and 6, or simultaneously performed. Also, it should be understood that the methods depicted in FIGS. 5 and 6 may be altered to encompass any of the other features or aspects as described elsewhere in the specification. Further, embodiments of system 10 may be implemented in software and can be adapted to run on different platforms and operating systems. In particular, functions implemented by current ramp controller 100 and/or compensation module 122, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

What is claimed is:

1. An adaptive digital ramp current control method, comprising:
   automatically digitally ramping a current level supplied to a light emitting diode (LED) according to a predetermined ramp profile, the ramp profile comprising at least one intermediate current level step between a minimum current level and a maximum current level; and,
   holding the at least one intermediate current level for a predetermined time period based on the ramp profile.

2. The method of claim 1 further comprising automatically adjusting the ramp profile.

3. The method of claim 1 wherein ramping comprises digitally incrementing from the minimum current level to the at least one intermediate current level.

4. The method of claim 1 wherein ramping comprises digitally decrementing from the maximum current level to the at least one intermediate current level.

5. The method of claim 1 further comprising storing the ramp profile to a memory disposed in an imaging system.

6. The method of claim 1 further comprising generating the ramp profile based on at least one of a radio frequency (RF) emission and a ground bounce measurement associated with actuation of the LED.

7. The method of claim 1 further comprising automatically modifying the ramp profile based on at least one of a RF emission and a ground bounce measurement associated with actuation of the LED.

8. An adaptive digital ramp current control system, comprising:
   a digital current ramp controller configured to automatically digitally ramp a current level supplied to at least one light emitting diode (LED) according to a predetermined ramp profile, the ramp profile comprising at least one intermediate current level step between a minimum current level and a maximum current level; and,
   a compensation module configured to generate and/or automatically modify the ramp profile based on at least one of a radio frequency (RF) emission and a ground bounce measurement associated with actuation of the at least one LED.

9. The system of claim 8 wherein the digital current ramp controller is configured to hold the at least one intermediate current level for a predetermined time period based on the ramp profile.

10. The system of claim 8 wherein the digital current ramp controller is configured to incrementally ramp the current level from the minimum current level to the at least one intermediate current level.

11. The system of claim 8 wherein the digital current ramp controller is configured to decrementally ramp the current level from the maximum current level to the at least one intermediate current level.

12. The system of claim 8 wherein the digital current ramp controller is disposed on an application specific integrated circuit (ASIC).

13. An imaging system, comprising:
   a photosensitive element for generating a scanned image of an object;
   at least one light emitting diode (LED) for illuminating the object; and
   a digital current ramp controller configured to automatically digitally ramp a current level supplied to the at least one (LED) according to a predetermined ramp profile, the ramp profile comprising at least one intermediate current level step between a minimum current level and a maximum current level,
   wherein the digital current ramp controller is configured to hold the at least one intermediate current level for a predetermined time period based on the ramp profile.

14. The system of claim 13 wherein the digital current ramp controller is at least partially integrated into an application specific integrated circuit (ASIC).

15. The system of claim 13 further comprising a compensation module configured to dynamically modify the ramp profile.

16. The system of claim 13 further comprising a compensation module configured to automatically generate the ramp profile based on at least one of a radio frequency (RF) emission and a ground bounce measurement associated with actuation of the at least one LED.

* * * * *

UNITED STATES PATENT AND TRADEMARK OFFICE
CERTIFICATE OF CORRECTION

PATENT NO. : 7,830,560 B2  Page 1 of 1
APPLICATION NO. : 11/700458
DATED : November 9, 2010
INVENTOR(S) : Kenneth K. Smith et al.

It is certified that error appears in the above-identified patent and that said Letters Patent is hereby corrected as shown below:

In column 4, line 57, delete "at to" and insert -- at $t_0$ to --, therefor.

Signed and Sealed this
Nineteenth Day of April, 2011

David J. Kappos
*Director of the United States Patent and Trademark Office*